US010724558B2

(12) United States Patent
Boeck et al.

(10) Patent No.: US 10,724,558 B2
(45) Date of Patent: Jul. 28, 2020

(54) FASTENING UNIT FOR A RADIO AND/OR SENSOR MODULE (71) Applicant: Robert Bosch GmbH, Stuttgart (DE)

(72) Inventors: Cornelius Boeck, Kirchheim (DE); Michael Mayer, Wiernsheim (DE); Andreas Riedel, Filderstadt (DE); Joachim Schadow, Stuttgart (DE); Joern Stock, Leinfelden-Echterdingen (DE); Steffen Tiede, Herrenberg (DE); Manfred Lutz, Filderstadt (DE); Joerg Maute, Sindelfingen (DE); Florian Esenwein, Leinfelden-Echterdingen (DE); Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 15/740,978

(22) PCT Filed: May 2, 2016

(86) PCT No.: PCT/EP2016/059781
§ 371 (c)(1),
(2) Date: Apr. 12, 2018

(87) PCT Pub. No.: WO2017/001087
PCT Pub. Date: Jan. 5, 2017

(65) Prior Publication Data
US 2018/0216642 A1 Aug. 2, 2018

(30) Foreign Application Priority Data

Jun. 30, 2015 (DE) .......................... 10 2015 212 189

(51) Int. Cl.
*G01D 11/30* (2006.01)
*F16B 2/20* (2006.01)
*G01D 11/24* (2006.01)

(52) U.S. Cl.
CPC .............. *F16B 2/20* (2013.01); *G01D 11/245* (2013.01); *G01D 11/30* (2013.01)

(58) Field of Classification Search
CPC .......... F16B 2/20; G01D 11/245; G01D 11/30
See application file for complete search history.

(56) References Cited

U.S. PATENT DOCUMENTS 5,928,023 A * 7/1999 Buckner ............ H01R 13/6395
439/371
6,592,087 B2 * 7/2003 Pitault .................. G01D 11/245
248/201
(Continued)

FOREIGN PATENT DOCUMENTS

CN 201352126 Y 11/2009
CN 102691868 A 9/2012
(Continued)

OTHER PUBLICATIONS

International Search Report corresponding to PCT Application No. PCT/EP2016/059781, dated Jul. 13, 2016 (German and English language document) (7 pages).

*Primary Examiner* — Jamel E Williams
(74) *Attorney, Agent, or Firm* — Maginot, Moore & Beck LLP (57) ABSTRACT A fastening unit for a radio and/or a sensor module includes at least one of a radio and a sensor module that is configured to connect with an external application unit. The fastening unit is detachably connectable to the at least one of the radio and sensor module.

12 Claims, 6 Drawing Sheets (56) References Cited

U.S. PATENT DOCUMENTS

| | | | |
|---|---|---|---|
| 7,084,744 B2* | 8/2006 | Li | B60R 19/483 340/435 |
| 8,907,623 B2* | 12/2014 | Saur | H02J 50/10 320/114 |
| D774,455 S * | 12/2016 | Kim | D13/108 |
| D817,891 S * | 5/2018 | Santos | D13/152 |
| 10,143,097 B2* | 11/2018 | Santos | F16B 5/121 |
| 2009/0265815 A1* | 10/2009 | Alexandrov | C07K 14/415 800/298 |
| 2012/0210786 A1* | 8/2012 | Steinbrink | H04L 1/0015 73/431 |
| 2012/0327573 A1* | 12/2012 | Glauning | B25F 5/008 361/679.01 |
| 2017/0230735 A1* | 8/2017 | Schadow | G01D 7/00 |

FOREIGN PATENT DOCUMENTS

| | | |
|---|---|---|
| CN | 202974228 U | 6/2013 |
| DE | 295 06 386 U1 | 8/1995 |
| DE | 197 58 075 A1 | 2/1999 |
| DE | 10 2011 004 914 A1 | 9/2012 |
| WO | 2015/004132 A1 | 1/2015 |

\* cited by examiner

FASTENING UNIT FOR A RADIO AND/OR SENSOR MODULE

This application is a 35 U.S.C. § 371 National Stage Application of PCT/EP2016/059781, filed on May 2, 2016, which claims the benefit of priority to Serial No. DE 10 2015 212 189.5, filed on Jun. 30, 2015 in Germany, the disclosure of which is incorporated herein by reference in its entirety.

The disclosure relates to a fastening unit for a radio and/or sensor module.

SUMMARY

The fastening unit according to the disclosure has the advantage of being able to connect a radio and/or sensor module to an external application unit. The external application unit is herein advantageously configured as a portable power tool. Because the fastening unit is detachably connectable to the radio and/or sensor module, the radio and/or sensor module can be easily and cost-effectively fastened, in particular detachably, to an external application unit such as a portable power tool.

As a result of the features specified in the description, claims, and drawings, advantageous refinements of the system according to this disclosure are possible.

Advantageously, the fastening unit has at least one first housing part. The first housing part has at least one connection region having at least one connection element for receiving a radio and/or sensor module, so that the radio and/or sensor module can be connected in a simple and cost-effective manner to the fastening unit.

Advantageously, the connection element is provided to connect the first housing part to the radio and/or sensor module.

Advantageously, the first housing part has at least one first receiving region, which is provided to receive a power supply cable. Because the power supply cable is integrated in an external application unit, the first housing part of the fastening unit can be connected to the external application unit. This has the advantage that the radio and/or sensor module can be connected in a simple and cost-effective manner to the external application unit.

Advantageously, the fastening unit has at least one second housing part. The second housing part of the fastening unit has at least one second receiving region for receiving the power supply cable. The power supply cable can thus be securely connected to the radio and/or sensor module.

Advantageously, the first housing part has at least one first closure element, and the second housing part has at least one second closure element. Because the first housing part and the second housing part can be connected to each other at least via the closure elements, the power supply cable can be securely integrated in the fastening part.

In a particularly advantageous embodiment, the first housing part and the second housing part are integrally connected to each other via a hinge-like connecting element. As a result, the fastening unit can be connected to the external application in a particularly secure manner, since the first housing part and the second housing part are captively connected to each other.

In one embodiment according to the disclosure, the connection element is realized by a screw boss for the fixing of the radio and/or sensor module.

In a further embodiment according to the disclosure, the connection element is realized by a latching element for the fixing of the radio and/or sensor module.

Preferredly, means, in particular web-like elements, are attached to the first housing part and to the second housing part. Advantageously, the web-like elements are provided to create a friction closure and/or form closure between the power supply cable and the two housing parts. A power supply cable can thus be fitted in a simple and secure manner between the two housing parts of the fastening unit.

Further advantages and expedient embodiments can be derived from the description of the figures and from the drawings.

BRIEF DESCRIPTION OF THE DRAWINGS

In the drawings, embodiments of a fastening unit according to the disclosure and of a radio and/or sensor module according to the disclosure are shown, wherein.

DETAILED DESCRIPTION

For the same components appearing in the different illustrative embodiments, the same reference numerals are used.

Figure 1:
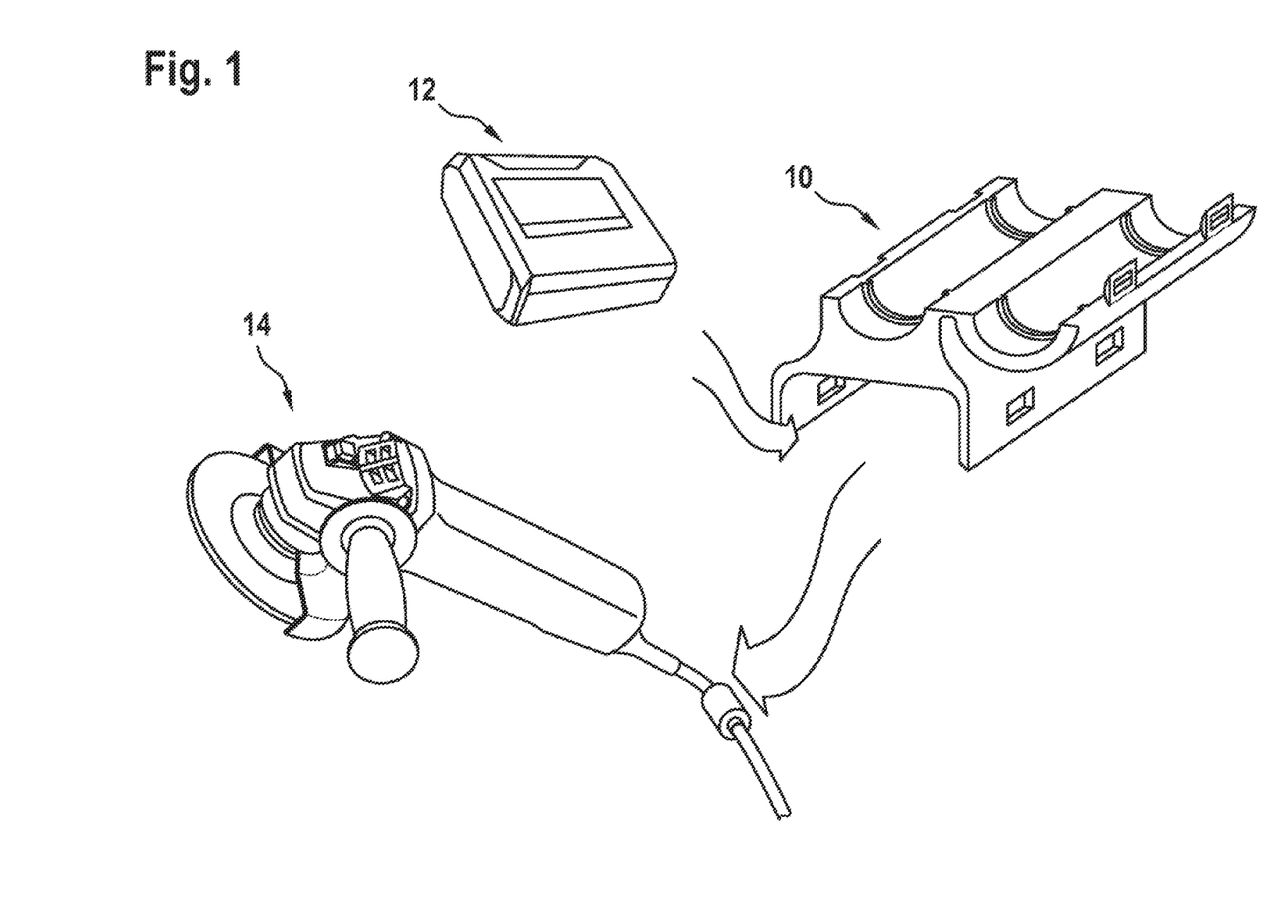
FIG. 1 shows an arrangement of a fastening unit according to the disclosure, a radio and/or sensor module, and an external application unit.

FIG. 1 shows a fastening unit 10, a radio and/or sensor module 12, and an external application unit 14. The fastening unit 10 is provided to be detachably connected to the radio and/or sensor module 12. The radio and/or sensor module 12 can be connected, in particular, to the external application unit 14. The external application unit 14 is preferredly a portable power tool.

Figure 2:
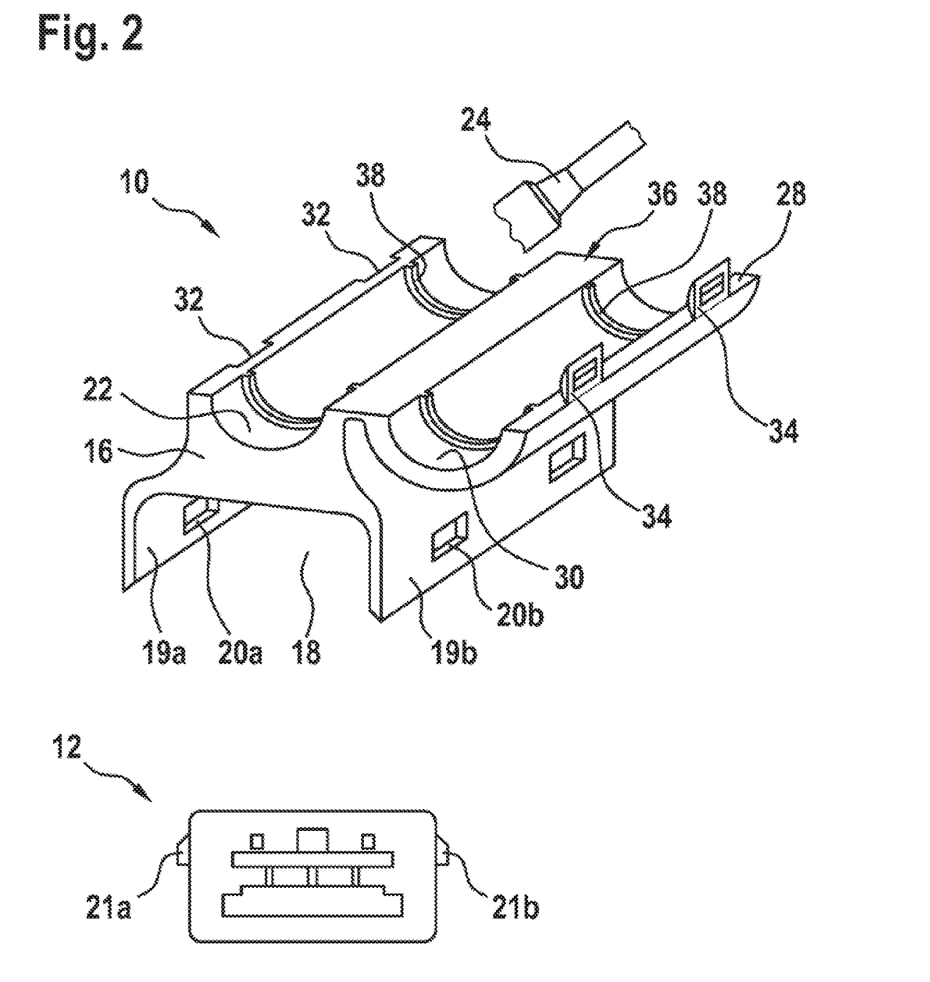
FIG. 2 shows a fastening unit according to the disclosure for a radio and/or sensor module, in schematic representation.

As can be seen in FIG. 2, the fastening unit 10 has a first housing part 16. The first housing part 16 comprises a connection region 18. The connection region 18 is provided to receive the radio and/or sensor module 12. The connection region 18 is partially delimited by two mutually opposing housing walls 19a and 19b. The first housing wall 19a comprises a first connection element 20a. The second housing wall 19b comprises a second connection element 20b. The radio and/or sensor module 12 is here connected to the first housing part 14 fixedly via the connection elements 20a, 20b, yet such that it is detachable by manual means or by a suitable tool. The connection can herein be realized by latching, clamping, plugging, insertion, bolting or the like. In the illustrative embodiment in FIG. 2, the connection elements 20a, 20b are realized by two latching grooves. However, more or fewer than two latching grooves can also be provided on the fastening module 10. The latching grooves correspond with at least two latching bosses 21a and 21b disposed on the radio and/or sensor module 12. However, more or fewer than two latching bosses can also be provided on the radio and/or sensor module 12.

On a side lying opposite the connection region 18, the first housing part 14 has a first receiving region 22. The first receiving region 22 is provided to receive a power supply cable 24. The power supply cable 24 is here disposed in the first receiving region 22.

The power supply cable 24 is a component part of the external application unit 14. The power supply cable 24 serves as an electrical energy source for the external application unit 14.

The fastening unit 10 additionally has a second housing part 28. The second housing part 28 comprises at least one second receiving region 30 for receiving the power supply cable 24.

On the first housing part 16 are disposed two first closure elements 32. On the second housing part 28 are disposed two second closure elements 34. Via the closure elements 32, 34, the first housing part 16 and the second housing part 28 are connectable to each other, lockable and releasable. The connection can herein be realized by latching, clamping, plugging, insertion, bolting or the like.

In addition, the first housing part 16 and the second housing part 28 are integrally connected to each other via a hinge-like connecting element 36.

The fixing of the power supply cable 24 is effected by the arrangement of the power supply cable 24 in the first receiving region 22 of the first housing part 16 and by the mutual connection of the two housing parts 16, 28. Particularly advantageously, the first housing part 16 and the second housing part 28 have web-like elements 38. Once the power supply cable 24 is connected to the first housing part 16 and the second housing part 28, the web-like elements 38 partially clamp the power supply cable 24 and thus create a friction closure and form closure between the power supply cable 24 and the two housing parts 16, 28.

Figure 3:
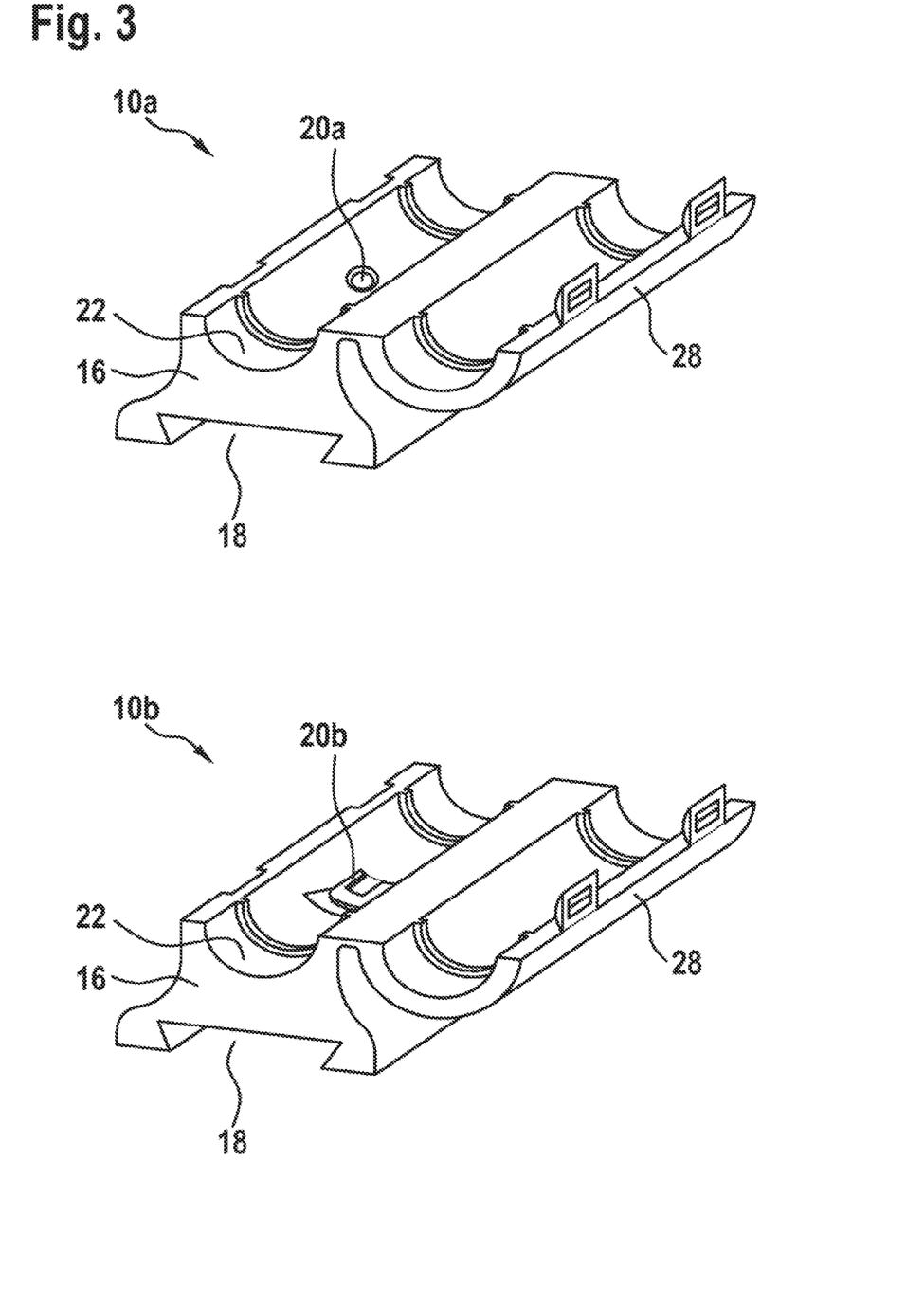
FIG. 3 shows a second and third embodiment of the fastening unit for a radio and/or sensor module, in schematic representation.

FIG. 3 shows 2 embodiments of a fastening unit 10. In the first embodiment 10a, the connection element 20a is disposed in the first receiving region 22 of the first housing part 16. In the first embodiment 10a, the connection element 20a is realized by a screw boss for the fixing of the radio and/or sensor module 12. In the second embodiment 10b, the connection element 20b is disposed in the first receiving region 22 of the first housing part 16. In the second embodiment 10b, the connection element 20b is realized by a latching element 20b for the fixing of the radio and/or sensor module 12. The connection region 18 is in both embodiments designed as a dovetail guide.

Figure 4:
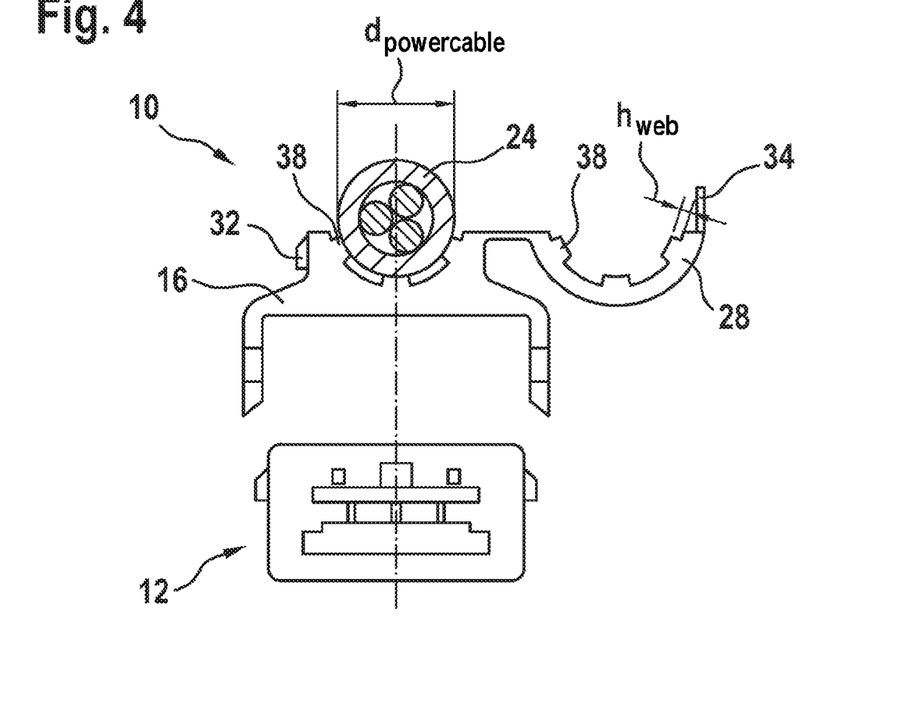
FIG. 4 shows a fourth embodiment of the fastening unit for a radio and/or sensor module, in schematic representation.

FIG. 4 shows a further illustrative embodiment of a fastening unit 10.

The web-like elements 38 determine with their geometric dimensions the dimensioning of a diameter $d_{powercable}$ of the power supply cable 24. Given a predefined dimensioning of the first housing part 16 and of the second housing part 28, the height $h_{web}$ of the web-like elements 38 define the permissible diameter of the power supply cable 24 $d_{powercable}$ in mm. Since the fastening unit 10 is an inexpensive component, for different diameters $d_{powercable}$ of the power supply cable 24 various fastening units can be cost-effectively provided. To this end, from one injection mold, several variants of the fastening unit, with different geometric dimensions of the web-like elements 38, can be provided.

Figure 5:
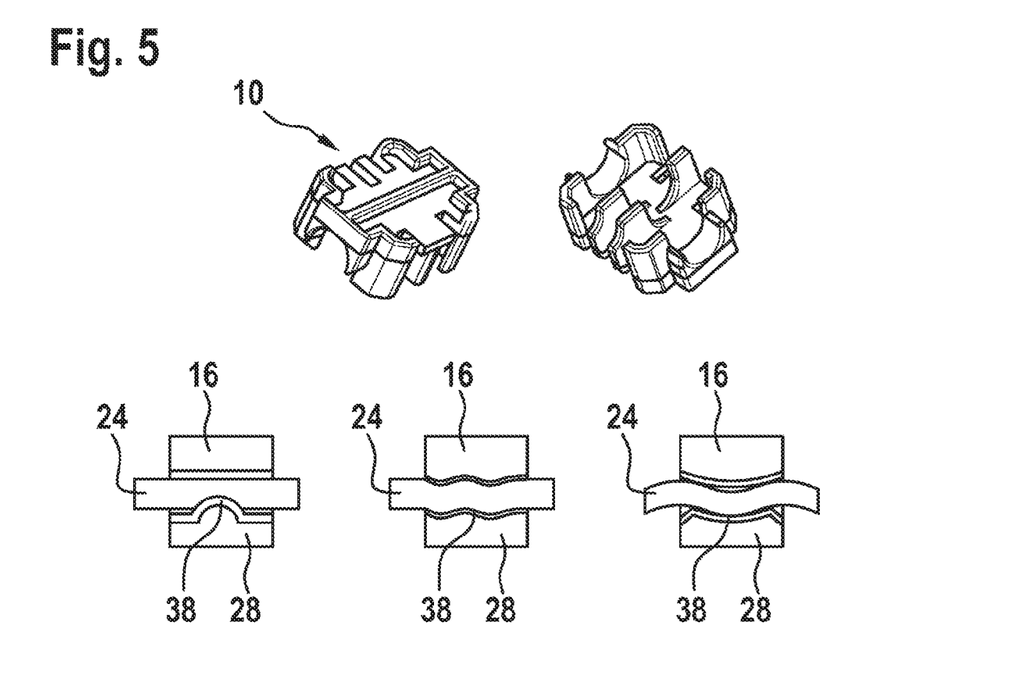
FIG. 5 shows three embodiments of a clamping connection for a power supply cable.

FIG. 5 shows a further illustrative embodiment of a fastening unit 10.

The fixing of the power supply cable 24 is preferably ensured by web-like elements 38, which allow the power supply cable 24 to be guided around the corners. The guide of the power supply cable 24 herein runs similarly to a labyrinth or the like.

Figure 6:
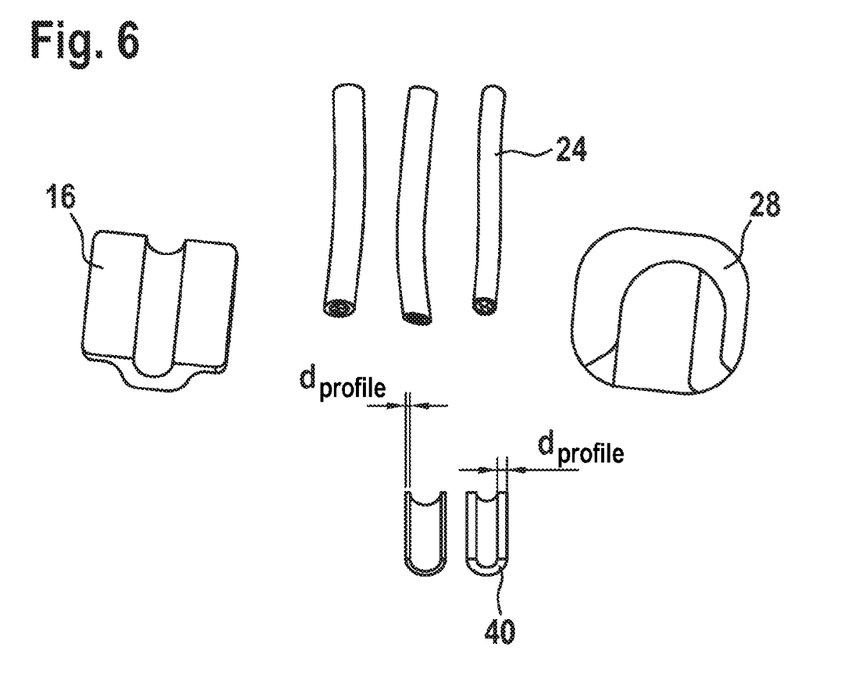
FIG. 6 shows a fifth embodiment of the fastening unit for the radio and/or sensor module, in schematic representation.

FIG. 6 shows a further embodiment of the fastening part 10 for the radio and/or sensor module 12 according to this disclosure.

In the embodiment according to FIG. 6, the first housing part 16 and the second housing part 28 of the fastening part 10 are separate components. In order to be able to fix power supply cables 24 of variable diameter $d_{powercable}$, profiled parts 40 are inserted into the first housing part 16.

The profiled parts 40 have a wall diameter d profile. The wall diameter defines the diameter $d_{powercable}$ of the power supply cable 24. One possibility for adapting the diameter $d_{powercable}$ of the power supply cable 24 consists in arranging a corresponding profiled part 40, made of plastic, rubber or the like, into the first housing part 16.

In a further step, the power supply cable 24 is assigned. Finally, the first housing part 16 is connected to the second housing part 28.

Figure 7:
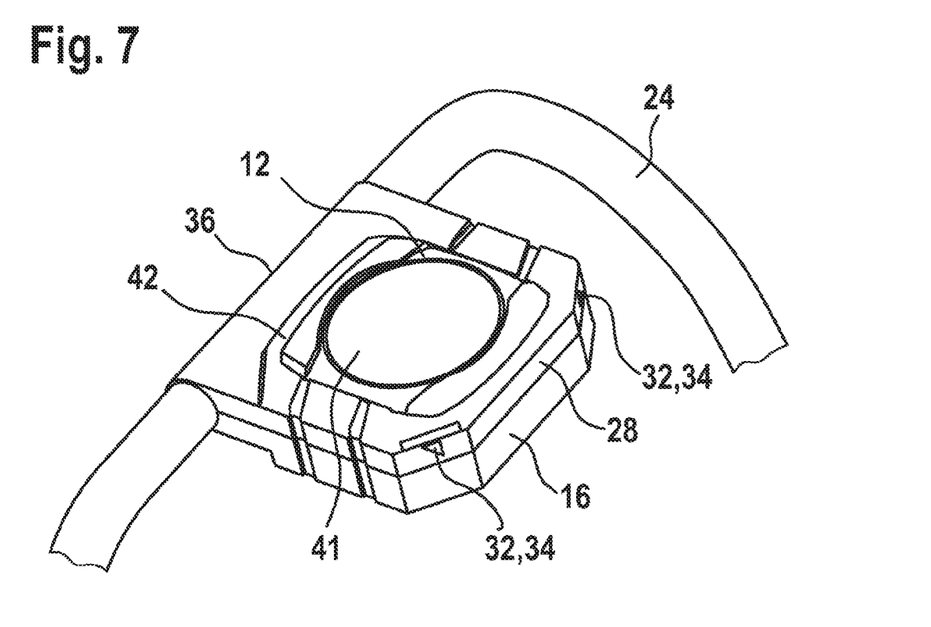
FIG. 7 shows a sixth embodiment of the fastening unit for a radio and/or sensor module, in schematic representation.

FIG. 7 shows a further embodiment of the fastening unit 10 for a radio and/or sensor module 12 according to this disclosure. The radio and/or sensor module 12 has a cap 40. The cap 40 of the radio and/or sensor module 12 can be opened in order to remove and/or exchange elements of the radio and/or sensor module 12, such as, for instance, an energy supply 50 of the radio and/or sensor module 12. The second housing part 28 has an opening 42. The opening 42 is provided for easier accessibility to the cap 40 of the radio and/or sensor module 12, and hence for the facilitated exchange of the energy supply of the radio and/or sensor module 12.

Figure 8:
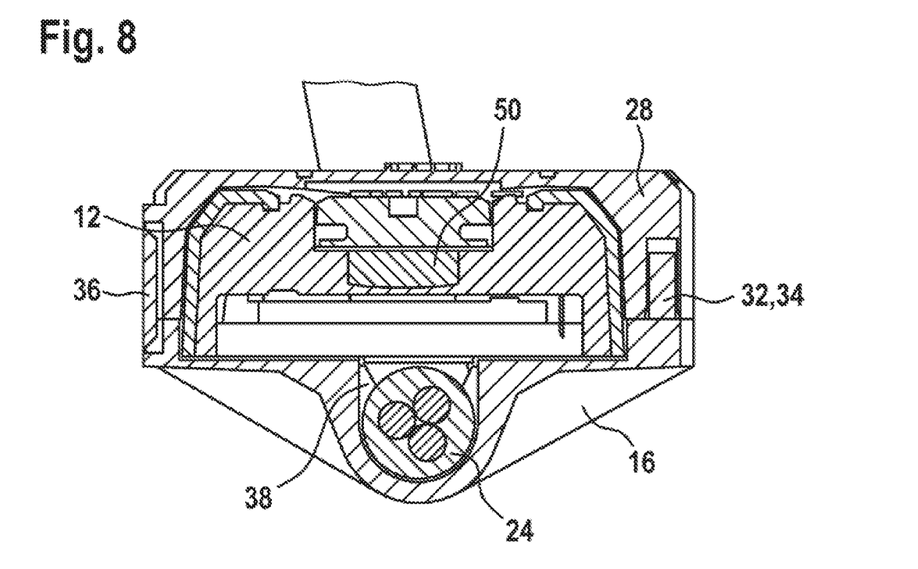
FIG. 8 shows a seventh embodiment of the fastening unit for a radio and/or sensor module, in schematic representation.

FIG. 8 shows a further embodiment of the fastening unit 10 for a radio and/or sensor module 12 according to this disclosure. In this illustrative embodiment in FIG. 7, the second housing part 28 is, in particular, of closed design. The radio and/or sensor module 12 is in this case accommodated in the second housing part 28. In the second housing part 28 is likewise disposed an energy supply 50 for the radio and/or sensor module 12.

Figure 9:
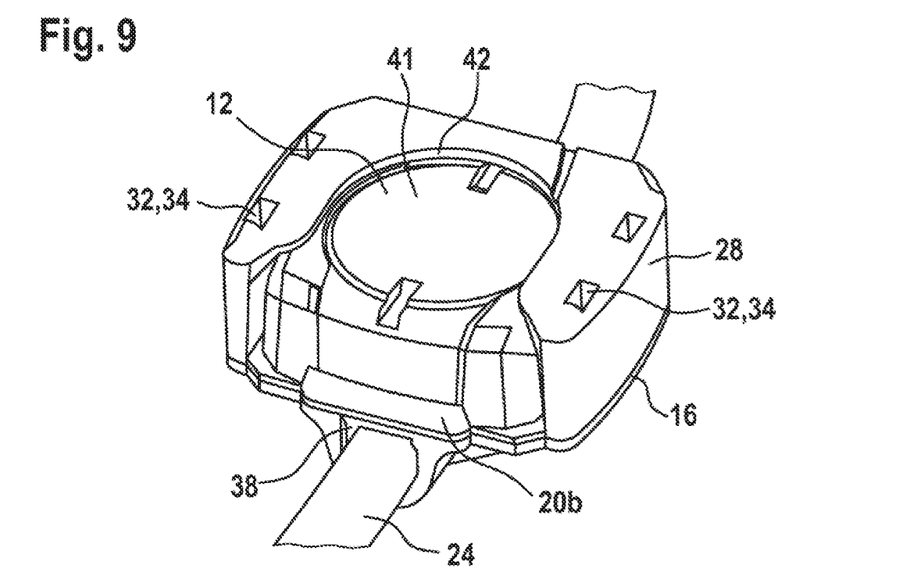
FIG. 9 shows an eighth embodiment of the fastening unit for a radio and/or sensor module, in schematic representation.

FIG. 9 shows a further embodiment of the fastening unit 10 for a radio and/or sensor module 12 according to this disclosure. The radio and/or sensor module 12 has a cap 40. The cap 40 of the radio and/or sensor module 12 can be opened in order to remove and/or exchange elements of the radio and/or sensor module 12 such as, for instance, an energy supply of the radio and/or sensor module 12. The second housing part 28 has an opening 42. The opening 42 is provided for easier accessibility to the cap 40 of the radio and/or sensor module 12, and hence for the facilitated exchange of the energy supply 50 of the radio and/or sensor module 12.

The invention claimed is:

1. A fastening unit for fastening a module to an external application unit, comprising:
   a body that is detachably connectable to a module that is at least one of a radio and a sensor module and that is configured to connect to an external application unit;
   at least one first housing part including at least one connection region having (i) at least one connection element configured to connect the at least one first housing part of the fastening unit to the module and (ii) at least one first receiving region configured to receive a power supply cable; and at least one second housing part including at least one second receiving region configured to receive the power supply cable, wherein:

the at least one first housing part of the fastening unit further includes at least one first closure element;

the at least one second housing part of the fastening unit further includes at least one second closure element; and the at least one first closure element and the at least one second closure element are configured to connect the at least one first housing part and the at least one second housing part to each other.

2. The fastening unit as claimed in claim 1, wherein the power supply cable is integrated in the external application unit.

3. The fastening unit as claimed in claim 1, further comprising:

a hinge-like connecting element that integrally connects the at least one first housing part and the at least one second housing part.

4. The fastening unit as claimed in claim 1, wherein the at least one connection element includes a screw boss configured to fix the module.

5. The fastening unit as claimed in claim 1, wherein:

the module includes an openable cap; and opening the cap enables at least one of removal of and exchanging of one or more elements of the module.

6. The fastening unit as claimed in claim 5, wherein the at least one second housing part further includes at least one opening that enables access to the cap of the module.

7. The fastening unit as claimed in claim 5, wherein the one or more elements of the module includes an energy supply of the module.

8. The fastening unit as claimed in claim 1, wherein the at least one connection element includes a latching element configured to fix the module.

9. The fastening unit as claimed in claim 1, wherein the at least one first closure element and the at least one second closure element are configured to form at least one of a friction closure and a form closure between the power supply cable, the at least one first housing part of the fastening unit, and the at least one second housing part of the fastening unit.

10. A module for use in an external application unit, wherein:

the module is at least one of a radio module and a sensor module; and the module is detachably fixable to the external application unit via a fastening unit, the fastening unit including:

a body that is detachably connectable to a module that is at least one of a radio and a sensor module and that is configured to connect to an external application unit;

at least one first housing part including at least one connection region having (i) at least one connection element configured to connect the at least one first housing part of the fastening unit to the module and (ii) at least one first receiving region configured to receive a power supply cable; and at least one second housing part including at least one second receiving region configured to receive the power supply cable, wherein:

the at least one first housing part of the fastening unit further includes at least one first closure element;

the at least one second housing part of the fastening unit further includes at least one second closure element; and the at least one first closure element and the at least one second closure element are configured to connect the at least one first housing part and the at least one second housing part to each other.

11. An external application unit comprising:

a fastening unit connected to the external application unit; and a module that is at least one of a radio module and a sensor module, and that is detachably connected to the fastening unit, wherein the external application unit is an angle grinder.

12. The external application unit of claim 11, wherein the fastening unit comprises:

a body that is detachably connectable to the module that is configured to connect to the external application unit;

at least one first housing part including at least one connection region having (i) at least one connection element configured to connect the at least one first housing part of the fastening unit to the module and (ii) at least one first receiving region configured to receive a power supply cable; and at least one second housing part including at least one second receiving region configured to receive the power supply cable, wherein:

the at least one first housing part of the fastening unit further includes at least one first closure element;

the at least one second housing part of the fastening unit further includes at least one second closure element; and the at least one first closure element and the at least one second closure element are configured to connect the at least one first housing part and the at least one second housing part to each other.

* * * * *